United States Patent

[11] 3,548,868

| [72] | Inventor | John Joseph Mullaney III<br>Warwick, R.I. |
|---|---|---|
| [21] | Appl. No. | 705,501 |
| [22] | Filed | Feb. 14, 1968 |
| [45] | Patented | Dec. 22, 1970 |
| [73] | Assignee | Sealol, Inc.<br>Warwick, R.I.<br>a corporation of Delaware |

[54] CHECK VALVE WITH SPRING ASSISTED FLEXIBLE AUXILIARY VALVE SEAT
3 Claims, 4 Drawing Figs.

[52] U.S. Cl. .................................... 137/515.5,
  137/516.29, 137/543.13, 137/543.21, 137/243
[51] Int. Cl. ...................................................... F16k 15/02
[50] Field of Search ........................................... 251/332,
  333, 334; 137/515.5, 516.25, 516.27, 516.29,
  543.13, 543.19, 543.21(Slush Pump Digest),
  242, 243

[56] References Cited
UNITED STATES PATENTS

| 3,029,835 | 4/1962 | Biello et al. .................... | 137/515.5 |
| 3,097,666 | 7/1963 | Antrim et al. ................... | 137/515.5 |
| 3,186,430 | 6/1965 | Koutnik ........................... | 137/516.29 |

*Primary Examiner*—William F. O'Dea
*Assistant Examiner*—David J. Zobkiw
*Attorney*—William Frederick Werner ABSTRACT: Check valve with spring assisted flexible auxiliary valve seat for fluids in cryogenics range to minus four hundred twenty degrees Fahrenheit.

PATENTED DEC 22 1970  3,548,868

INVENTOR
JOHN JOSEPH MULLANEY, III.
BY
William Frederick Werner
ATTORNEY

2

CHECK VALVE WITH SPRING ASSISTED FLEXIBLE AUXILIARY VALVE SEAT

This invention relates to check valves having flexible auxiliary valve seats and more particularly to a flexible auxiliary valve seat construction wherein structural means are provided to compensate for contraction and metal fatigue in going from normal to subzero temperatures.

The present invention is an improvement over U.S. Pat. No. 3,029,835 dated Apr. 17, 1962 for a Check Valve With Resilient Auxiliary Seal by S. J. Biello and H. Lindeboom.

Check valves having an operating range from +100° F. to −420° F. are subject to vast size changes due to thermal contraction and expansion. The problem of providing an operative check valve under these changing temperature conditions is further complicated by the coefficient of expansion and contraction varying in degree in the several different types of material used in the construction of the valve and in the change in physical characteristics of the metal at subzero temperatures.

Accordingly, it is an object of the present invention to provide a valve structure which will operate efficiently at +100° F. or −420° F. in spite of the change in the physical characteristics of the material from ductal to brittleness.

Other objects of the present invention will become apparent in part and be pointed out in part in the following specification and claims.

Referring to the drawings in which similar characters of reference indicate corresponding parts in all the figures.

Figure 1:
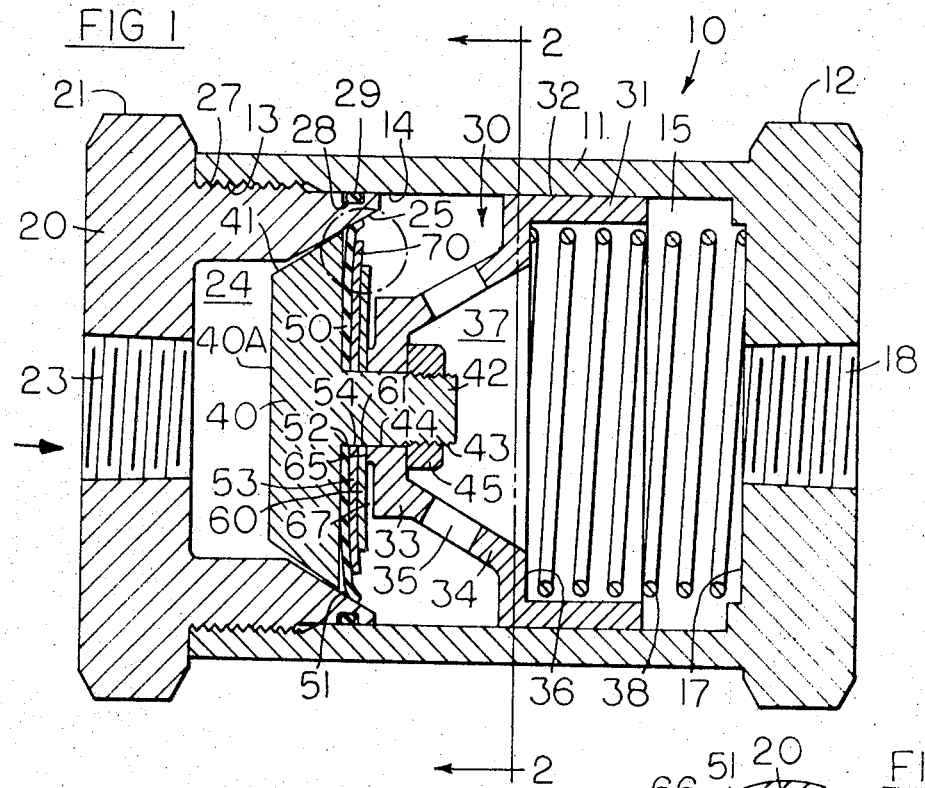
FIG. 1 is a medial longitudinal cross-sectional view through the new and improved check valve.
Figure 2:
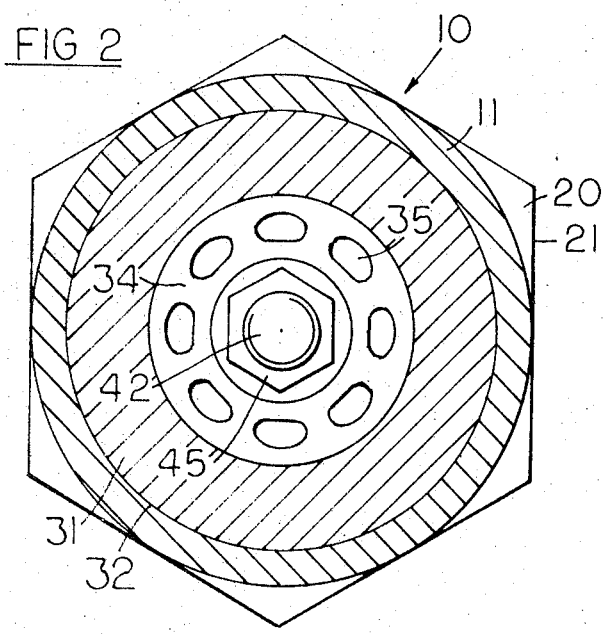
FIG. 2 is a vertical cross-sectional view taken along line 2–2 of FIG. 1.

Reference is now made to the drawings. The new and improved check valve, generally indicated by reference numeral 10 consists of a body 11 provided externally with an hexagonal shaped shoulder 12 or other pipe wrench gripping means. Axially, body 11 is provided with a cage seat 14 which forms a chamber 15, a spring seat 17, a threaded portion 13 and a port 18 which may be threaded for a pipe connection.

A gland 20, hexagonal in shape on an enlarged shoulder 21, is provided axially with a stepped bore consisting of a port 23 which may be threaded for a pipe connection, a flow passageway 24 and a beveled valve seat 25. Gland 20 in its external surface is provided with threads 27 and a fluid packing circular seat 28. Gland 20 is secured to body 11 through threads 27 rotatively engaging threaded portion 13. Fluid packing 29, which may take the form of an "O" ring is located in seat 28 and engages cage seat 14.

A cage generally indicated at 30, and having an enlarged circular flange 31 provided with a bearing surface 32 is provided with a cage head 33 attached to circular flange 31 by means of a bevel spider portion 34. The spider portion 34 is provided with a plurality of ports 35. Flange 31 and spider portion 34, axially form a hollow area 37 having a spring seat 36.

Bearing surface 32 is slidably mounted upon cage seat 14. A coil spring 38, or other resilient member, is located in chamber 15 and hollow area 37, which is a continuation of chamber 15, and is interposed between spring seats 17 and 36.

A valve head 40 is provided with a beveled valve surface 41 and a stem 42 having a threaded area 43. Stem 42 is supported in head 33 through an opening 44 provided for that purpose. A nut 45 is rotatively mounted upon threaded area 43.

The essence of the present invention will now be described.

A disc 50 is provided with a diameter which is greater than the largest diameter on valve head 40, so as to provide a wiping surface 51 which engages beveled valve seat 25, when the valve is in closed position, as shown in FIG. 1.

Disc 50 is also provided with an axial orifice 52 so that disc 50 may be slid over stem 42.

Disc 50 is fabricated from material, normally deemed rigid, such as stainless steel, monel metal, or plastic material, such as Teflon or Nylon.

Disc 50 is fabricated from one of the materials mentioned, but is of such a reduced thickness, as to provide a flexible wiping area 51 on the outer surface.

Figure 3:
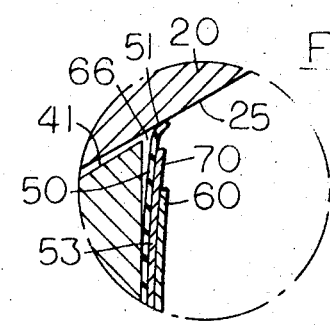
FIG. 3 is an enlarged cross-sectional view of the poppet, enclosed in the dot and dash circle in FIG. 1.

A backup plate 53 fabricated from material having spring steel qualities is provided with an axial bore 54, so as to be slidable over stem 42. Plate 53, as shown in FIGS. 1 and 3 is of a diameter which is smaller than the largest diameter on valve head 40.

A second supporting plate 60 fabricated from material having spring steel qualities is provided with a central orifice 61, so as to be slidable over stem 42. Second supporting plate 60, as shown in FIGS. 1 and 3, is of a diameter which is smaller than the outside surface of backup plate 53. Note: Cage head 33 is smaller in diameter than plate 60.

The material, used to fabricate backup plate 53 and second supporting plate 60, must be resistant to bend so long as the force does not exceed the modulus of elasticity of the material. These elements 53 and 60 must be elastic so as to possess spring reaction qualities, in a manner, and for the purposes presently to be described.

It will be noted, with reference to FIG. 1, that nut 45 draws valve head 40 toward cage head 33 to thereby squeeze disc 50, backup plate 53 and second supporting plate 60 therebetween, in fluid tight relationship, to the extent of the area of face 65. In this manner, fluid in chamber 15 cannot creep along threads 43 and stem 42, past axial orifice 52 to flow between disc 50 and valve head 40.

In theory, valve surface 41 engages beveled valve seat 25 to provide a fluid tight seal. This is a true condition at normal room temperatures.

However, at cryogenic temperatures, below −50° F. contraction of valve head 40, usually in a nongeometric manner, causes valve surface 41 to disengage beveled valve seat 25, whereby fluid tight integrity is lost. When this condition exists fluid flows between the interfaces 25, 41, to force disc 50 away from valve head 40 to form a space 66. The fluid acts upon disc 50 to force wiping area 51 away from valve seat 25. Fluid tight integrity would then be lost. The fluid flow is in the direction of the arrow in FIG. 1.

However, backup plate 53 with inherent springlike qualities supports and reinforces disc 50 so that disc 50 resists the fluid forces tending to force wiping area 51 away from valve seat 25.

Figure 4:
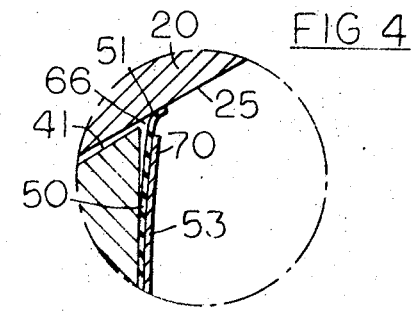
FIG. 4 is an enlarged fragmentary cross-sectional view of a modified form of disc and backup plate.

It will be noted, with continued reference to FIGS. 1 and 3, that a space 67 is provided between valve head 40 and backup plate 53. This space 67 permits back pressure fluid to act against an area of second supporting plate 60, when plate 60 is used, (FIG. 3) and against an area of plate 53 when plate 60 is not used (FIG. 4) to assist the inherent spring forces in, respectively, plate 60 and/or plate 53 to force wiping edge 51 into fluid tight relation with beveled valve seat 25.

This being a check valve fluid under pressure enters port 23, to flow into flow passageway 24, so as to act upon front face 40A of valve head 40 to force valve surface 41 away from beveled valve seat 25 against the force of spring 38 and the force of the back pressure in chamber 15. The back pressure acts upon disc 50, backup plate 53, nut 45 and other surfaces, such as on cage 30 which face toward outlet port 18 and in space 67 to assist the pressure in spring 38 to force valve surface 41 against valve seat 25.

The spring 38 and back pressure acting on the surfaces enumerated and especially the back pressure acting upon the back of wiping area 51 enables wiping area 51 to maintain fluid tight integrity with beveled valve seat 25 until the fluid pressure acting upon face 40A is sufficiently great to overcome the opposing forces. Because wiping area 51 is flexible, the initial movement of valve head toward the outlet port 18, termed "cracking" permits the unseating of valve surface 41 and wiping area 51 without the usual chatter and interruption of fluid flow through the valve.

The second supporting plate 60 is provided to assist the backup plate 53 to maintain a springlike force upon disc 50 at the unsupported area on backup plate 53 at very low temperatures when cold and contraction lower the resilience in backup plate 53.

Second supporting plate 60 assisted by the force of the fluid in space 67 provides rigidity to backup plate 53 so that the rim 70 on plate 53 remains springlike, at very low cryogenic temperatures. Thus, wiping area 51 is further assisted in engaging beveled valve seat 25, at very low temperatures, to thereby maintain fluid tight integrity to pressures predetermined by spring 38 and the back pressure forces.

The degree of springlike qualities in backup plate 53 and second supporting plate 60 will be determined by the fluid forces passing thru the valve and the temperature of the fluid.

Space 66 serves the additional function of permitting wiping area 51 to seek concentric engagement with beveled valve seat 25 without the hindrance of engaging valve head 40.

Having shown and described a preferred embodiment of the present invention, by way of example, it should be realized that structural changes could be made and other examples given without departing from either the spirit or scope of this invention.

I claim:

1. A check valve consisting of a body provided axially with a cage seat forming a chamber and a port communicating with said chamber, a gland, means attaching said gland to a said body, said gland provided axially with a port communicating with said chamber, a flow passageway and a beveled valve seat aligned with said chamber, a cage having a circular flange provided with a bearing surface slidably engaging said cage seat, and located in said chamber, a cage head, a beveled spider portion having a plurality of flow through ports connecting said cage head to said circular flange, a resilient means interposed between said cage and said body, a valve head provided with a beveled valve surface, engageable and disengageable with said beveled valve seat, a disc having a diameter greater than the largest diameter on said valve head thereby providing a flexible wiping surface engageable and disengageable with said beveled valve seat, a backup plate having a diameter smaller than the largest diameter on said valve head and means fastening said valve head, disc and backup plate to said cage head to block and unblock fluid flow through said chamber, said cage head having a diameter smaller than the outside surface of said backup plate, said resilient means urging said beveled valve surface and said flexible wiping surface toward said beveled valve seat.

2. Apparatus as set forth in claim 1 wherein a second support plate having a diameter smaller than the outside surface of said backup plate is interposed and fastened between said backup plate and said cage head to thereby provide a springlike rim on said backup plate, the cage head being smaller in diameter than the diameter of said second supporting plate.

3. Apparatus as set forth in claim 2 wherein a space is provided between said disc and said valve head and a second space is provided between said second supporting plate and said cage head.